US010618704B2

(12) United States Patent
Nabeth

(10) Patent No.: US 10,618,704 B2
(45) Date of Patent: Apr. 14, 2020

(54) CAP MADE OF FOAMED POLYMERIC MATERIAL, AND METHOD OF MAKING SAME

(71) Applicant: OBRIST CLOSURES SWITZERLAND GMBH, Reinach (CH)

(72) Inventor: Bruno Nabeth, Nice (FR)

(73) Assignee: Obrist Closures Switzerland Gmbh, Reinach (CH)

( * ) Notice: Subject to any disclaimer, the term of this patent is extended or adjusted under 35 U.S.C. 154(b) by 134 days.

(21) Appl. No.: 15/122,178

(22) PCT Filed: Feb. 24, 2015

(86) PCT No.: PCT/EP2015/053780
§ 371 (c)(1),
(2) Date: Aug. 28, 2016

(87) PCT Pub. No.: WO2015/128303
PCT Pub. Date: Sep. 3, 2015

(65) Prior Publication Data
US 2016/0368673 A1    Dec. 22, 2016

(30) Foreign Application Priority Data
Feb. 28, 2014 (FR) ...................... 14 51642

(51) Int. Cl.
*B65D 47/08* (2006.01)
*B29C 44/58* (2006.01)
(Continued)

(52) U.S. Cl.
CPC .......... *B65D 47/0838* (2013.01); *B29C 44/02* (2013.01); *B29C 44/586* (2013.01);
(Continued)

(58) Field of Classification Search
CPC B65D 47/0838; B65D 41/0407; B65D 41/00; B65D 47/08; B29C 44/02; B29C 44/586; B29K 2023/12; B29L 2031/565
(Continued)

(56) References Cited

U.S. PATENT DOCUMENTS 2,375,221 A * 5/1945 Grice ..................... B65D 45/06
222/481
3,022,925 A * 2/1962 Daniell .................. A47G 19/24
206/806
(Continued)

FOREIGN PATENT DOCUMENTS

CN   102431708   2/2012
WO   WO 2011025916   3/2011  ............. B29C 44/38
WO   WO 2012160952   11/2012  ............. B29C 45/16

OTHER PUBLICATIONS

International Search Report And Written Opinion Of The International Searching Authority, dated Aug. 18, 2015, International Patent Application No. PCT/EP2015/053780.
(Continued)

Primary Examiner — James N Smalley
(74) Attorney, Agent, or Firm — Nicholas J. Landau; Jake M. Gipson; Bradley Arant Boult Cummings LLP

(57) ABSTRACT

A cap for a bottle, which comprises at least a sealing portion and a lateral portion for fastening to the bottle. The sealing portion comprises, along a direction substantially perpendicular to the lateral portion, a first region formed of unfoamed polymeric material, a second region formed of foamed polymeric material, and a third region formed of unfoamed polymeric material, the second region being positioned between the first region and the third region. The disclosure also relates to a process for manufacturing a cap made of foamed polymeric material.

11 Claims, 5 Drawing Sheets

(51) Int. Cl.
*B29K 23/00* (2006.01)
*B29L 31/56* (2006.01)
*B65D 41/00* (2006.01)
*B29C 44/02* (2006.01)
*B65D 41/04* (2006.01)

(52) U.S. Cl.
CPC ......... *B65D 41/00* (2013.01); *B65D 41/0407* (2013.01); *B65D 47/08* (2013.01); *B29K 2023/12* (2013.01); *B29L 2031/565* (2013.01)

(58) Field of Classification Search
USPC ............... 215/235, 306, 321, 348; 222/556; 220/254.3, 810–849
See application file for complete search history.

(56) References Cited

U.S. PATENT DOCUMENTS

| | | | | |
|---|---|---|---|---|
| 3,663,025 | A * | 5/1972 | Nadherny | F16J 15/061 220/315 |
| 4,076,152 | A * | 2/1978 | Mumford | B65D 47/122 215/321 |
| 4,089,434 | A * | 5/1978 | Tagalakis | B65D 41/045 215/260 |
| 4,638,909 | A * | 1/1987 | Ford | B44D 3/04 206/1.7 |
| 4,744,478 | A | 5/1988 | Hahn | 215/252 |
| 4,879,138 | A * | 11/1989 | Johnson | B65D 41/0407 215/252 |
| 4,941,580 | A * | 7/1990 | Julian | B65D 41/32 215/225 |
| 5,598,940 | A * | 2/1997 | Finkelstein | B65D 41/045 215/347 |
| 6,299,005 | B1 * | 10/2001 | Higgins | B65D 41/48 215/237 |
| 6,702,137 | B1 * | 3/2004 | Kowa | A47J 41/0027 215/235 |
| 2001/0027957 | A1 | 10/2001 | Kano | 215/341 |
| 2003/0146248 | A1 * | 8/2003 | Hierzer | B65D 47/0809 222/556 |
| 2004/0149675 | A1 | 8/2004 | Perry et al. | 215/228 |
| 2012/0199610 | A1 * | 8/2012 | Cain | B65D 35/10 222/212 |
| 2015/0314934 | A1 * | 11/2015 | Eberlein | B65D 55/16 215/243 |

OTHER PUBLICATIONS

French Search Report and Written Opinion, dated Jul. 15, 2014, French Application No. FR 1451642.
Alain Dong "Third Office Action—CN application No. 201580009669. X" The State Intellectual Property Office of the People's Republic of China; dated Oct. 12, 2018.

* cited by examiner

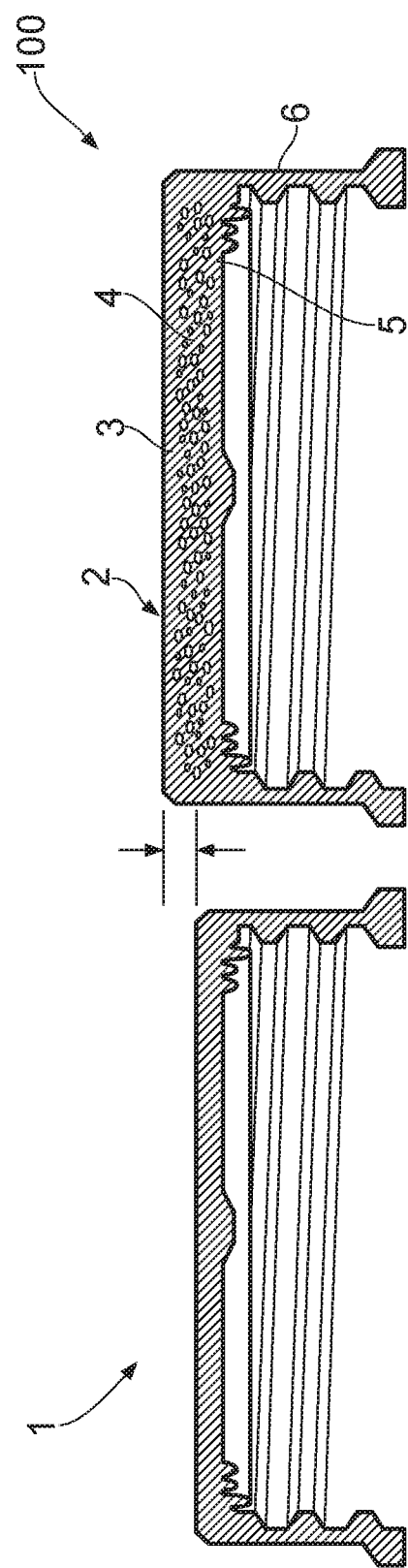

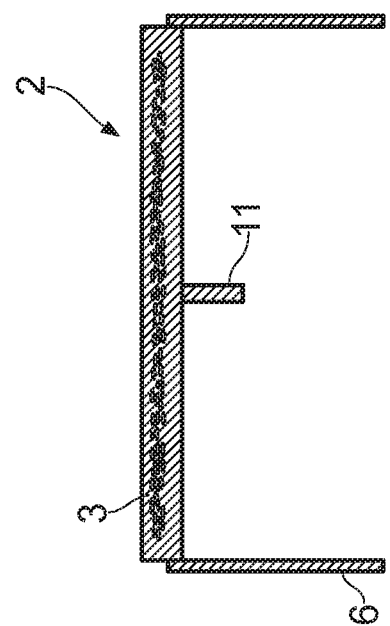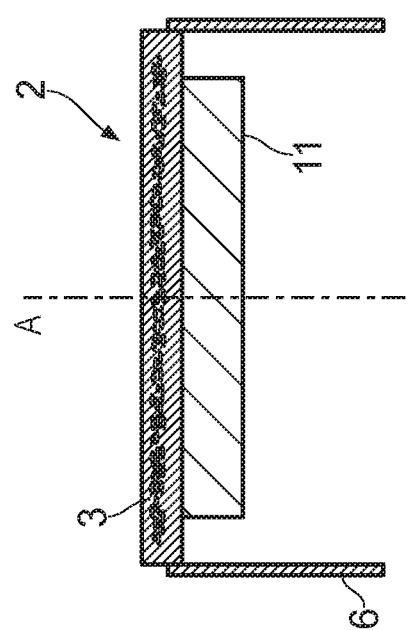

US 10,618,704 B2

CAP MADE OF FOAMED POLYMERIC MATERIAL, AND METHOD OF MAKING SAME

RELATED APPLICATIONS

This Application is the U.S. National Stage of International Patent Application No. PCT/EP2015/053780, filed Feb. 24, 2015, published in English, which designates the U.S., and claims priority under 35 U.S.C. §§ 119 and 365 to French Application No. FR 1451642, filed Feb. 28, 2014. The disclosures of the above Applications are hereby incorporated by reference herein in their entireties.

FIELD OF THE DISCLOSURE

This disclosure relates generally to sealing arrangements and, more particularly, to a cap, closure, top or the like for a bottle, and a process for manufacturing same.

BACKGROUND OF THE DISCLOSURE

Plastic caps are typically manufactured from polymeric materials converted in a thermoplastic injection molding process, which comprises melting the material in a regulated screw/barrel assembly and pushing the material into a multi-cavity mold in order to enable the material to be formed and cooled.

Operators in this field are confronted with the costs of the plastic materials used which increase proportionally with the cost of hydrocarbons.

The present invention aims to reduce the costs by proposing a cap for a bottle intended to contain a fluid, the cap comprising at least a sealing portion and a lateral portion intended to be fastened to the bottle, the sealing portion comprising along a direction substantially perpendicular to the lateral portion a first region formed of unfoamed plastic material, a second region formed of foamed plastic material and a third region formed of unfoamed plastic material, the second region being positioned between the first region and the third region.

Thus, the presence of the second region made of foamed plastic material makes it possible to achieve a sufficient cap thickness to ensure that the necessary stiffness is obtained, while limiting the amount of raw materials used. A reduction in the weight of the caps then enables the reduction of the costs while retaining the functional, physical and chemical properties of the caps.

The expression "unfoamed plastic material" is understood in the present document to mean a solid plastic material corresponding to "unfoamed plastic material" or "plain material".

Furthermore, the first and third regions formed of unfoamed plastic material correspond to what is sometimes referred to as "the skin" and the second region formed of foamed plastic material is sometimes referred to as the "foamed core".

OBJECTS AND SUMMARY OF THE DISCLOSURE

According to one arrangement of this disclosure, the sealing portion of the cap comprises a sealing wall having a shape generally of a disc and suitable for sealing the neck of the bottle. In this configuration, the lateral portion includes a lateral wall having a generally cylindrical shape which forms a skirt that is solidly attached to the sealing wall.

Advantageously, the cap is obtained from a formulation comprising at least one propylene-based polyolefin and at least one blowing agent in a proportion of active components of between 0.3% and 2.5% by weight.

This formulation leads to good foaming under the conditions of manufacture by thermal injection moulding via the use of a masterbatch which includes at least one blowing agent in dilute form in a matrix compatible with the resin converted. The homogenization and thermal activation of the blowing agent take place in a screw/barrel assembly.

When the cap is intended for applications in the food, pharmaceutical or paramedical field, the blowing agent is advantageously selected from endothermic agents such as citric acid, sodium bicarbonate or a mixture of these agents.

Preferably, the formulation comprises a melt flow index of between 20 and 50 g/10 min so that the sealing portion has an impact strength of 3.5 to 10 kJ/m$^2$ in a notched Izod impact test at 23° C. These values are obtained according to the ISO 179/IeA standard. Furthermore, such a melt flow index enables the formulation to be injected at relatively low temperatures, of the order of 200-210° C. This reduces the time needed for the cooling of the cap, which corresponds to the longest length of time in the process, so that the cycle time is substantially reduced.

Also preferably, the material of the sealing portion comprises an expansion ratio of between 30% and 70%. This makes it possible to achieve sufficient stiffness despite a reduced amount of material.

Advantageously, the sealing portion has a thickness of between 1.3 and 1.7 mm so as to have an apparent flexural modulus of 800 to 1500 MPa. Indeed, this thickness of the sealing portion is critical considering the expansion ratio. If the thickness was smaller, the sealing portion could display failures in terms of mechanical stiffness so that the cap would not be able to be suitable for all uses. Indeed, when the bottle contains, for example, a carbonated drink, the sealing portion must be able to withstand a pressure of more than 6 bar in order not to be deformed.

According to one arrangement, the sealing portion comprises an orifice intended for the passage of the fluid, the cap additionally comprising a closure portion arranged in order to close the orifice. Thus, the cap obtained makes it possible to guarantee a reliable closure of the bottle while facilitating the use thereof.

According to another arrangement, the closure portion is attached to the sealing portion by a hinge portion. Thus, the closure portion is solidly attached to the sealing portion so that the risk of losing the closure portion is limited.

Advantageously, the closure portion is formed, at least partly, by the foamed plastic material so that little material is needed for its manufacture.

Preferably, the hinge portion consists of the unfoamed plastic material so that it has sufficient mechanical fatigue strength (or hinge endurance) properties in order to be stressed and folded several times without breaking during the opening and closure of the orifice.

According to one variant, the sealing portion comprises a face oriented towards the side of the lateral portion and from which at least one reinforcing element consisting of unfoamed plastic material projects. The presence of at least one reinforcing element makes it possible to reduce the amount of raw material for the manufacture of the sealing portion. Indeed, the reinforcing elements stiffen the sealing portion so that its thickness may be reduced or so that its expansion ratio may be increased, while guaranteeing mechanical strength to the cap. Of course, the reinforcing element is arranged so as not to hamper the sealing of the bottle.

According to one arrangement, the closure portion comprises a face oriented on the side of the sealing portion in closure position and from which a reinforcing element made of unfoamed plastic material projects.

Preferably, the at least one reinforcing element is formed from a rib that extends substantially perpendicular to the face to which it is attached. This conformation guarantees the fact that the plastic material of the reinforcing element will remain unfoamed.

The at least one rib has any geometry suitable for stiffening the portion to which it is attached. It may have an overall shape of one or more concentric circles, of a circle endowed with inner radii or of a rectilinear shape.

The height of the at least one rib may be variable.

According to one possibility, the lateral portion of the cap comprises a screw thread formed from the unfoamed plastic material. This screw thread is suitable for being screwed to the neck of the bottle.

According to a second aspect, the invention also proposes a process for manufacturing a cap, the process comprising the steps consisting in:
a) providing a formulation and comprising at least one blowing agent,
b) providing an injection mould comprising a fixed part and a mobile part,
c) positioning the mobile part over the fixed part so as to create a first gap,
d) injecting the formulation into the injection mould so as to fill the first gap, and
e) moving the mobile part of the injection mould in an opening direction with respect to the fixed part of the injection mould so as to form a second gap greater than the first gap so that the blowing agent generates the expansion of the formulation in a direction perpendicular to the opening direction of the injection mould until the whole of the second gap is filled.

This process then makes it possible to easily manufacture a cap, the portions of which perpendicular to the opening direction of the mobile part may be foamed. The portions of the cap parallel to the opening direction of the mobile part of the mould having little space during the opening of the mould remain solidified, made of unfoamed plastic material. It is thus possible to manufacture a cap, the sealing portion of which is foamed whilst the fastening portions are made of unfoamed material.

Furthermore, depending on the thickness of the portions of the cap extending substantially perpendicular to the opening direction of the mould, certain portions will be cooled before being able to foam.

Preferably, the ratio between the second gap and the first gap is between 1.2 and 1.8. It is thus possible to obtain an expansion ratio of the plastic material of the order of 20% to 80%.

Also preferably, the ratio between the second gap and the first gap is between 1.3 and 1.7. The expansion ratio that can be achieved is then between 30% and 70%.

According to a third aspect, the invention relates to a formulation for the manufacture of a cap, the formulation comprising a melt flow index of between 20 and 50 g/10 min. Thus, the cooling of the injected formulation is very rapid. During the opening of the mould, only the plastic material of the thickest portions of the cap will have the time to foam. It is then possible to obtain a hinge portion that extends perpendicular to the opening direction of the mould made of unfoamed material so that this portion retains its fatigue strength properties ("hinge effect" typical of unfoamed polypropylene) as for a conventional cap.

According to one arrangement, the formulation is devoid of mineral fillers and comprises at least one polyolefin selected from a copolymer of propylene and ethylene PP, a homopolymer, a statistical copolymer or a mixture of these materials.

The statistical copolymer is commonly referred to as random copolymer or RCP.

According to one arrangement, the formulation comprises a nucleating agent, such as nucleating talc, sodium benzoate (NaBz such as sodium 2,2'-methylenebis(4,6-di-tert-butylphenyl)phosphate from Asahi Denka Kogyo K.K., known commercially under the name NA-11®), a phosphate ester salt or a calcium metal salt (Hyperform® HPN-20E) in a proportion of between 300 and 1500 ppm.

According to another arrangement, the formulation comprises a clarifying agent, such as a derivative of sorbitol (1,3:2,4-dibenzylidene sorbitol—DBS—Irgaclear D from CIBA or Millad 3905 from Milliken, 1,3;2,4-di-p-methyl-dibenzylidene sorbitol MDBS—Irgaclear DM from CIBA or Millad 3940 from Milliken, 1,3:2,4-di-m,p-methylbenzylidene sorbitol DMDBS, Millad 3988 from Milliken) in a proportion of between 500 and 2000 ppm or a derivative of nonitol (1,2,3-trideoxy-4,6:5,7-bis-O-[(4-propylphenyl)methylene]nonitol) in a proportion of between 3000 and 5000 ppm.

Advantageously, the active components of the blowing agent are in a proportion of between 0.3% and 2.5% by weight.

The blowing agent is selected from citric acid, sodium bicarbonate or a mixture of these compounds.

The present invention also provides a container closure comprising a top plate and a sidewall, the top plate comprising a layer of foamed plastics material sandwiched between two layers of unfoamed plastics material.

The present invention also provides a flip-top dispensing closure comprising a base and a lid joined by a hinge, the base including a top deck with a dispensing orifice and the lid comprising a top plate, in which the top deck and/or the top plate comprise a layer of foamed plastics material sandwiched between two layers of unfoamed plastics material.

The present invention also provides a flip-top dispensing closure comprising a base and a lid joined by a hinge, in which the hinge comprises foamed plastics material.

The present invention also provides a process for manufacturing a closure, comprising the steps of: a) providing a plastics formulation comprising at least one blowing agent, b) providing an injection mould, c) arranging the mould so as to create a first gap, d) injecting the formulation into the injection mould so as to substantially fill the first gap, and e) moving the mould so as to form a second gap greater than the first gap so that the blowing agent generates expansion of the formulation until substantially the whole of the second gap is filled whereby to selectively foam part of the closure.

The second gap may be created by partially opening the mould press. Alternatively or additionally the second gap may be created by movement within the mould.

Selective foaming on a cap in this way could be used, for example, for a hinge, membrane or the like.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

Other aspects, objectives and advantages of the present invention will appear more clearly on reading the following description of several embodiments thereof, given by way of non-limiting examples and with reference to the appended drawings. The figures are not necessarily to scale for all the elements represented so as to improve the readability thereof. In the remainder of the description, for the sake of simplicity, identical, similar or equivalent elements of the various embodiments bear the same numerical references.

BRIEF DESCRIPTION OF THE DRAWINGS

A specific, illustrative, representative bottle cap, according to the disclosure, is described below with reference to the accompanying drawings, in which:

FIG. 1 shows a cap, according to one embodiment of the disclosure, before blowing of a formulation of polymeric material;

FIG. 2 illustrates the cap of FIG. 1 after blowing of the formulation of polymeric material;

FIG. 4A illustrates a cap according to a further embodiment of the disclosure;

FIG. 4B is a sectional view of the cap taken along line A-A' of FIG. 4A;

The same numerals are used throughout the drawing figures to designate similar elements. Still other objects and advantages of the disclosure will become apparent from the following description of specific, illustrative embodiments.

DETAILED DESCRIPTION

Figure 3:
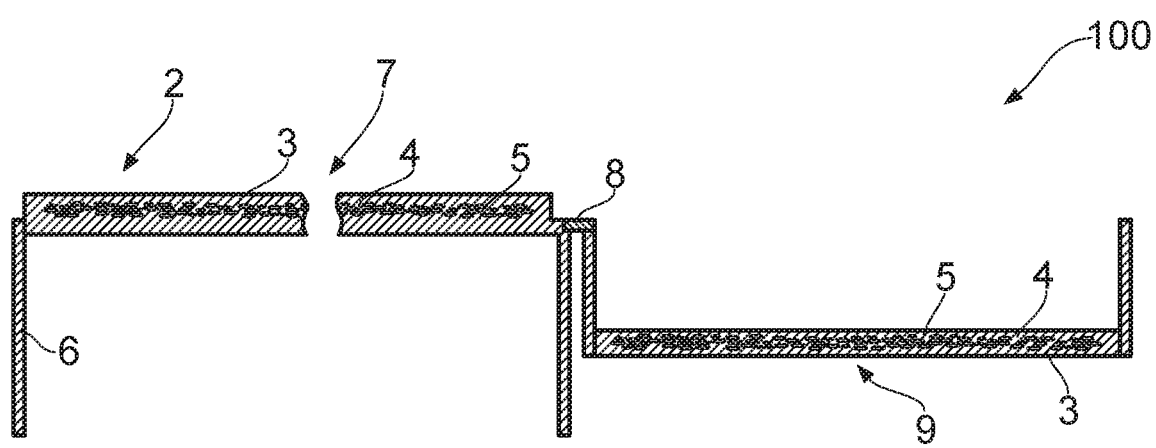
FIG. 3 represents a cap in accordance with another embodiment of the disclosure.

Example or representative embodiments are described below in sufficient detail to enable those of ordinary skill in the art to embody and implement the articles, systems and processes described. Such embodiments can be provided in many alternate forms and should not be construed as limited to the particular examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

FIG. 1 illustrates the shape of a precursor 1 of a cap according to the invention before blowing of the formulation of the plastic material and FIG. 2 illustrates the cap 100 for a bottle intended to contain a fluid, after blowing of the plastic material. The cap 100 comprises a sealing portion 2, having the general shape of a disc intended to seal a bottle, and a lateral portion 6 comprising a screw thread for fastening to the bottle. The lateral portion 6 has a cylindrical general shape solidly attached to the sealing portion 2. After blowing as illustrated in FIG. 2, the sealing portion 2 of the cap 100 has three regions that extend in a plane parallel to the plane of the disc a first region 3 made of unfoamed plastic material, commonly referred to as the skin, a second region 4 made of foamed plastic material commonly referred to as the foamed core and a third region 5 made of unfoamed plastic material or skin. The expansion ratio of the plastic material of the sealing portion 2 is around 50% so that it has a thickness of around 1.5 mm. This thickness and this expansion ratio make it possible to achieve mechanical properties similar to those of a conventional sealing portion 2. The lateral portion 6 is made of unfoamed plastic material, it has a thickness of around 1 mm.

According to one variant of the cap 100 that is not illustrated, the sealing portion 2 and the lateral portion 6 have other shapes. In another variant, the lateral portion 6 is devoid of a screw thread but comprises any other type of device for fastening to the bottle.

According to one variant that is not illustrated, the expansion ratio is between 20% and 80%. According to yet another variant, the expansion ratio is between 30% and 70%.

FIG. 3 illustrates a cap 100 according to a second embodiment of the invention. This cap 100 differs in particular from the cap 100 from the first embodiment in that it comprises an orifice 7 for the passage of a fluid and a closure portion 9 for closing the orifice 7, connected to the sealing portion 2 via a hinge portion 8. The sealing portion 2 and the closure portion 9 are formed of at least one foamed plastic material with an expansion ratio of 70%. The thicknesses of said portions 2, 9 are around 1.7 mm. Furthermore, the hinge portion 8 made of plastic material has a thickness of around 0.7 mm of unfoamed plastic material. Indeed, this thin thickness is very quickly cooled after injection of the formulation, so that when the mould is opened for the foaming, this portion 8 is already solidified. The lateral portion 6 is made of unfoamed material for the same reasons as those mentioned above.

According to one variant that is not illustrated, the cap 100 is devoid of the hinge portion 8 so that the closure portion 9 is not connected to the cap 100.

FIG. 4A illustrates a cap 100 according to a third embodiment which differs from the preceding two in that the face of the sealing portion 2 located on the side of the lateral portion 6 is equipped with a reinforcing element 11 that has the shape of a rib made of unfoamed plastic material that increases the mechanical strength of the sealing portion 2. FIG. 4B illustrates the same embodiment along a cross-sectional view along the axis A-A'. According to other possibilities that are not illustrated, the rib 11 may be curvilinear, may have several concentric circles, form a cross and any other shape that makes it possible to reinforce the sealing portion 2. According to yet another possibility that is not illustrated, the rib 11 is provided on the closure portion 9 of a cap 100.

The cap 100 illustrated in FIGS. 1 to 4 is obtained from a formulation comprising at least one propylene-based polyolefin and at least one blowing agent in a proportion of active components of between 0.3% and 2.5% by weight and a melt flow index of between 20 and 50 g/10 min. According to another variant, the polyolefin comprises a copolymer of propylene and ethylene PP, a homopolymer, a statistical copolymer or a mixture of these materials.

Figure 6:
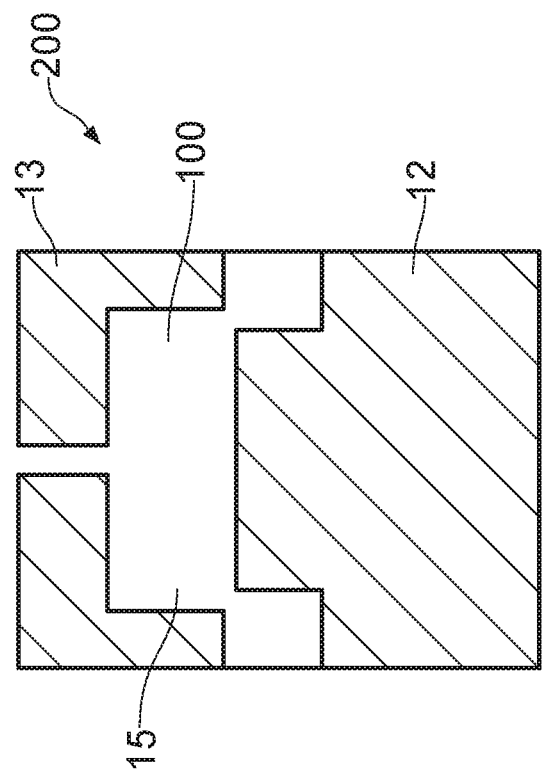
FIG. 6 shows a second step of the process set referenced in FIG. 5.
Figure 5:
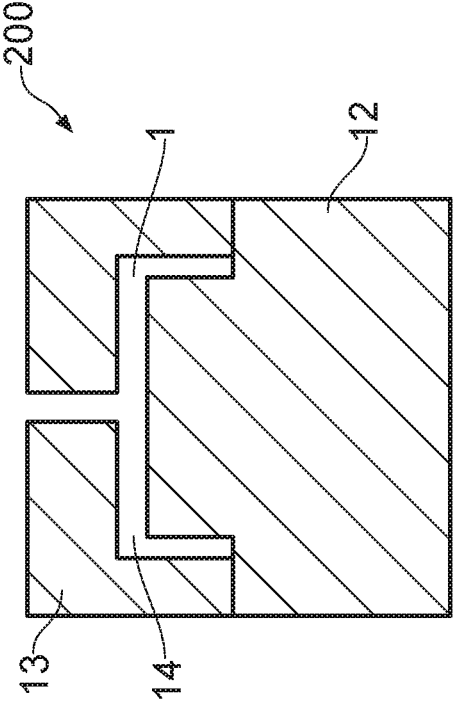
FIG. 5 illustrates a first step of a process for manufacturing a cap, according to one embodiment of the disclosure.

FIGS. 5 and 6 illustrate the process for manufacturing a cap 100 according to one embodiment of the invention.

FIG. 5 illustrates an injection mould 200 comprising a fixed part 12 and a mobile part 13 that are positioned with respect to one another so as to form a first gap 14. The formulation comprising a blowing agent is injected until the space formed by the first gap 14 is filled. The thinnest portions, such as the hinge portion 8 for example, cool very rapidly so that the plastic material solidifies. Then, as illustrated in FIG. 6, the mobile part 13 of the mould is moved with respect to the fixed part 12 so as to open the mould 200 by forming a second gap 15 larger than the first gap 14. The formulation then foams in a direction parallel to the opening direction (arrow 16) of the mould. Thus, the portions oriented in a direction substantially perpendicular to the opening direction 16 of the mould may foam until the whole of the space delimited by the second gap 15 is filled. Therefore, the sealing portion 2 of the cap 100 has at least one region 4 made of foamed plastic material between two skins 3, 5 and the lateral portion 6 has a plastic material that is not foamed due to lack of space.

The difference between the first gap 14 and the second gap 15 is determined by the desired expansion ratio. The second gap 15 is between 1.2 and 1.8 times the first gap 14.

Thus, the present invention proposes a light cap 100 that requires less raw material than a conventional cap while having the same properties. Furthermore, the invention also proposes a process for the manufacture of such caps which is simple and rapid to implement.

Figure 7:
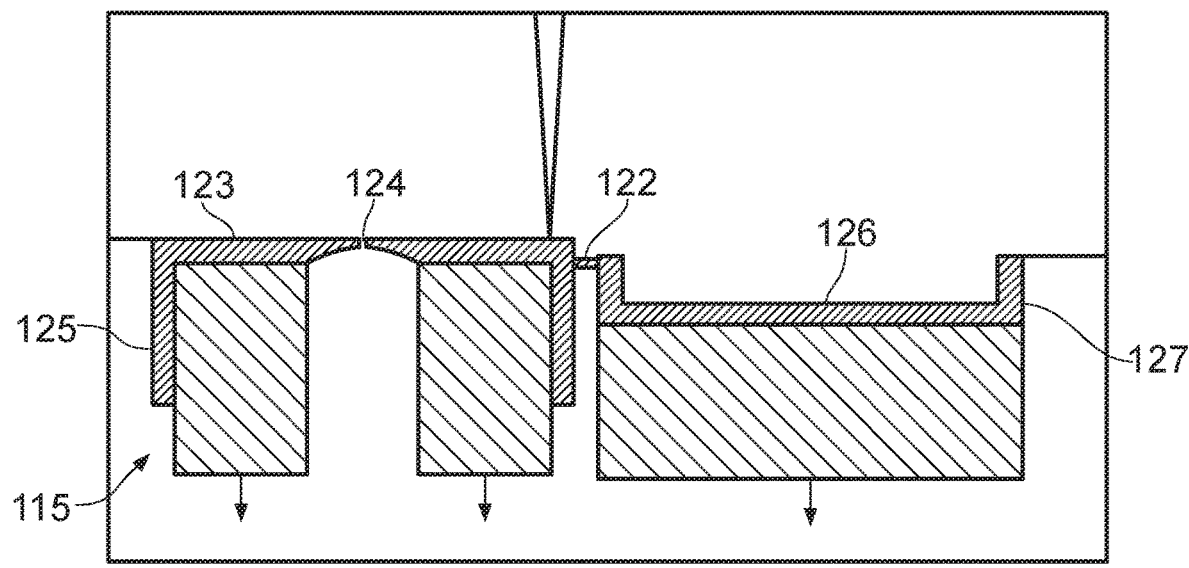
FIG. 7 illustrates a first step of a process for manufacturing a cap, according to an alternative embodiment of the disclosure.
Figure 8:
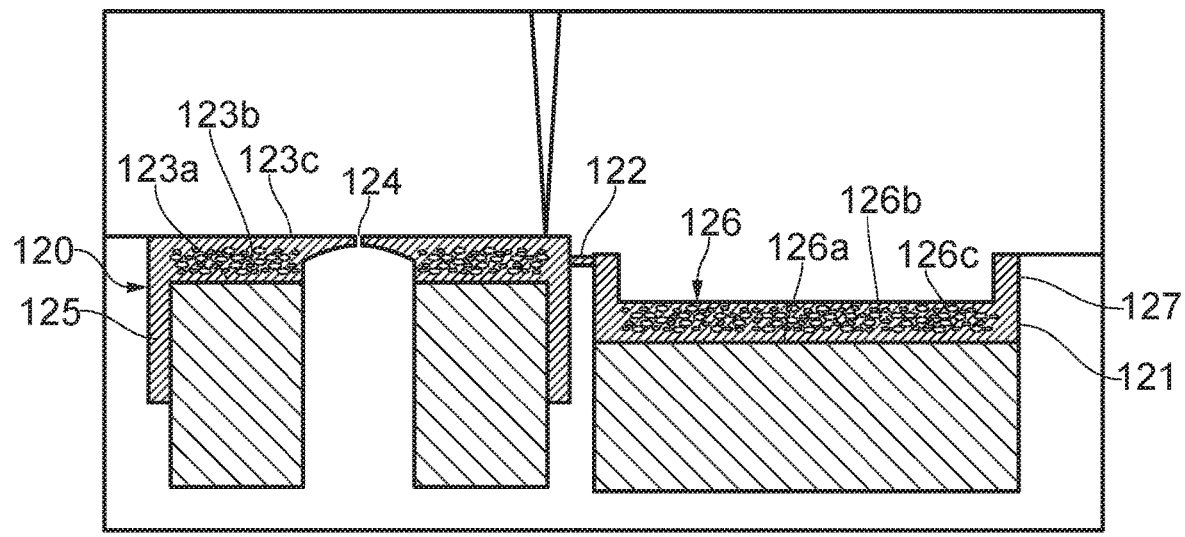
FIG. 8 shows a second step of the process referenced by FIG. 7.

FIGS. 7 and 8 illustrate an alternative moulding process.

FIG. 7 shows a first moulding phase in which a foamable plastics material is injected into a mould cavity to form an intermediate piece 115.

Thereafter an internal movement within the mould forms an enlarged cavity for a second moulding phase shown in FIG. 8 in which the material foams to fill the cavity to form the final piece 100.

In this embodiment the piece 100 is a flip-top dispensing closure with a base 120 and a lid 121 joined by a hinge 122. The base 120 includes a generally disc-shape, circular top deck 123 with a dispensing orifice 124 and a generally cylindrical sidewall 125 depending from the periphery of the deck 123. The lid 121 includes a disc-shape, generally circular top plate 126 with a generally cylindrical truncated sidewall 127 depending from the periphery thereof.

In this embodiment the movement of the mould expands the cavity in the region of the base top deck 123 and the lid top plate 126 to form a foamed core 123b, 126b sandwiched between two non-foamed layers 123a, 123c, 126a, 126c.

It goes without saying that the invention is not limited to the embodiment described above by way of example, but that it comprises all the technical equivalents and variants of the means described and also combinations thereof.

Although specific, illustrative embodiments have been disclosed in detail herein, with reference to the accompanying drawings, it is understood that the invention is not limited to the precise embodiments shown and that various changes and modifications can be effected therein by one skilled in the art without departing from the spirit and scope of the disclosure as defined by the appended claims and their equivalents.

The invention claimed is:

1. A flip-top dispensing closure comprising a base and a lid joined by a hinge, the base including a top deck with a dispensing orifice; and the lid comprising a top plate, wherein the top deck and/or the top plate comprise a layer of foamed polymeric material sandwiched between two layers of unfoamed polymeric material, wherein the hinge is formed from unfoamed polymeric material; and in which the top deck and the top plate both have a foamed core sandwiched between two non-foamed layers.

2. The closure of claim 1, in which the closure is obtained from a formulation comprising at least one propylene-based polyolefin and at least one blowing agent in a proportion of active components of between 0.3% and 2.5% by weight.

3. The closure of claim 1, in which the material of the top deck and/or top plate comprises an expansion ratio of between 30% and 70%.

4. The closure of claim 1, in which the closure is obtained from a formulation having a melt flow index of between 20 and 50 (g/10 min).

5. The closure of claim 1, in which the closure is obtained from a process for manufacturing a closure, the process comprising:
   (a) providing a plastics formulation comprising at least one blowing agent;
   (b) providing an injection mould;
   (c) arranging the mould so as to create a first gap;
   (d) injecting the formulation into the injection mould so as to substantially fill the first gap; and
   (e) moving the mould so as to form a second gap greater than the first gap so that the blowing agent generates expansion of the formulation until substantially the whole of the second gap is filled whereby to selectively foam part of the closure;
   in which the closure includes a base with a top deck and a lid with the top plate, the base and lid being joined by a hinge and in which the hinge has a thin thickness such that it is very quickly cooled and solidified before the mould is opened for foaming.

6. The closure of claim 5, wherein the process for manufacturing the closure comprises:
   (f) providing at step (a) a formulation comprising at least one propylene-based polyolefin and at least one blowing agent in a proportion of active components of between 0.3% and 2.5% by weight;
   (g) providing at step (b) an injection mould comprising a fixed part and a mobile part;
   (h) at step (c) positioning the mobile part over the fixed part so as to create a first gap;
   (i) at step (d) injecting the formulation into the injection mould so as to fill the first gap; and
   (j) at step (e) moving the mobile part of the injection mould in an opening direction with respect to the fixed part of the injection mould so as to form a second gap greater than the first gap so that the blowing agent generates the expansion of the formulation in a direction perpendicular to the opening direction of the injection mould until the whole of the second gap is filled.

7. The closure of claim 6, in which the ratio between the second gap and the first gap is between 1.2 and 1.8.

8. The closure of claim 5, in which formulation has a melt flow index of between 20 and 50 (g/10 min).

9. A process for manufacturing the cap of claim 1 which comprises the steps of:
   (i) providing a formulation which comprises at least one blowing agent;
   (ii) providing an injection mold which includes a fixed part and a mobile part;
   (iii) positioning the mobile part over the fixed part so as to create a first gap;
   (iv) infecting the formulation into the injection mold so as to fill the first gap; and (v) moving the mobile part of the injection mold in an opening direction with respect to the fixed part of the injection mold so as to form a second gap greater than the first gap so that the blowing agent generates the expansion of the formulation in a direction generally perpendicular to the opening direction of the injection mold until the whole of the second gap is filled.

10. The process set forth in claim 9, wherein the ratio between the second gap and the first gap is between about 1.2 and about 1.8.

11. The process set forth in claim 10, wherein the cap includes a base with a top deck and a lid with the top plate, the base and lid being joined by a hinge, and wherein movement of the mold to form the gap expands a cavity of the mold in a region of the base top deck and the lid top plate and not in the region of the hinge.

* * * * *